Aug. 13, 1968  W. C. ANDERSON  3,396,576
APPARATUS FOR MEASURING STATIC FORCES DYNAMICALLY
Filed Sept. 13, 1965  3 Sheets-Sheet 2
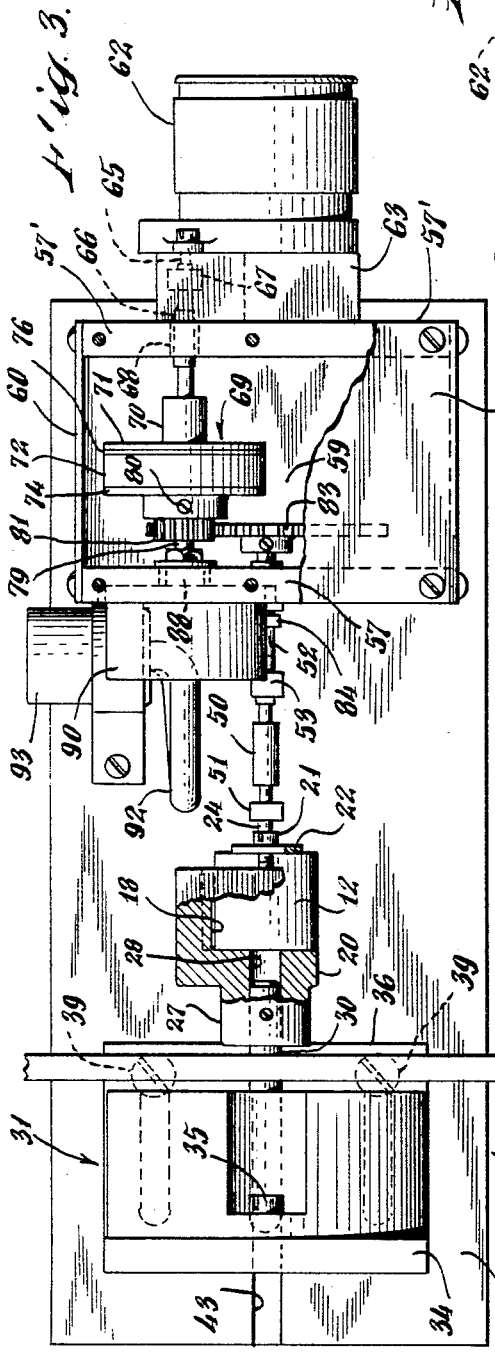
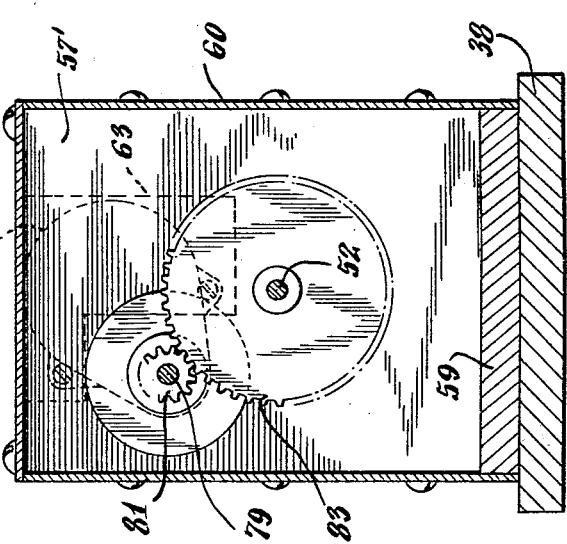
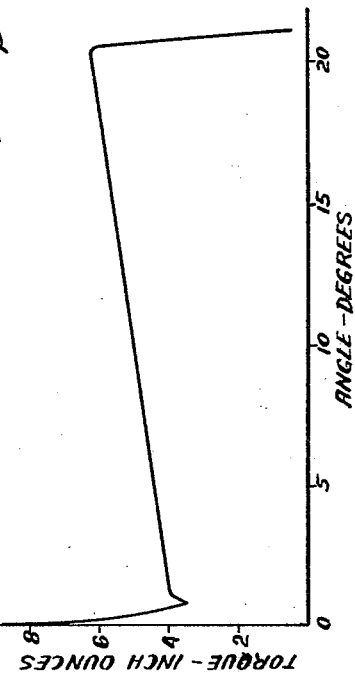
INVENTOR.
*Wilmer C. Anderson*
BY *Louis Altman*
ATTORNEY.

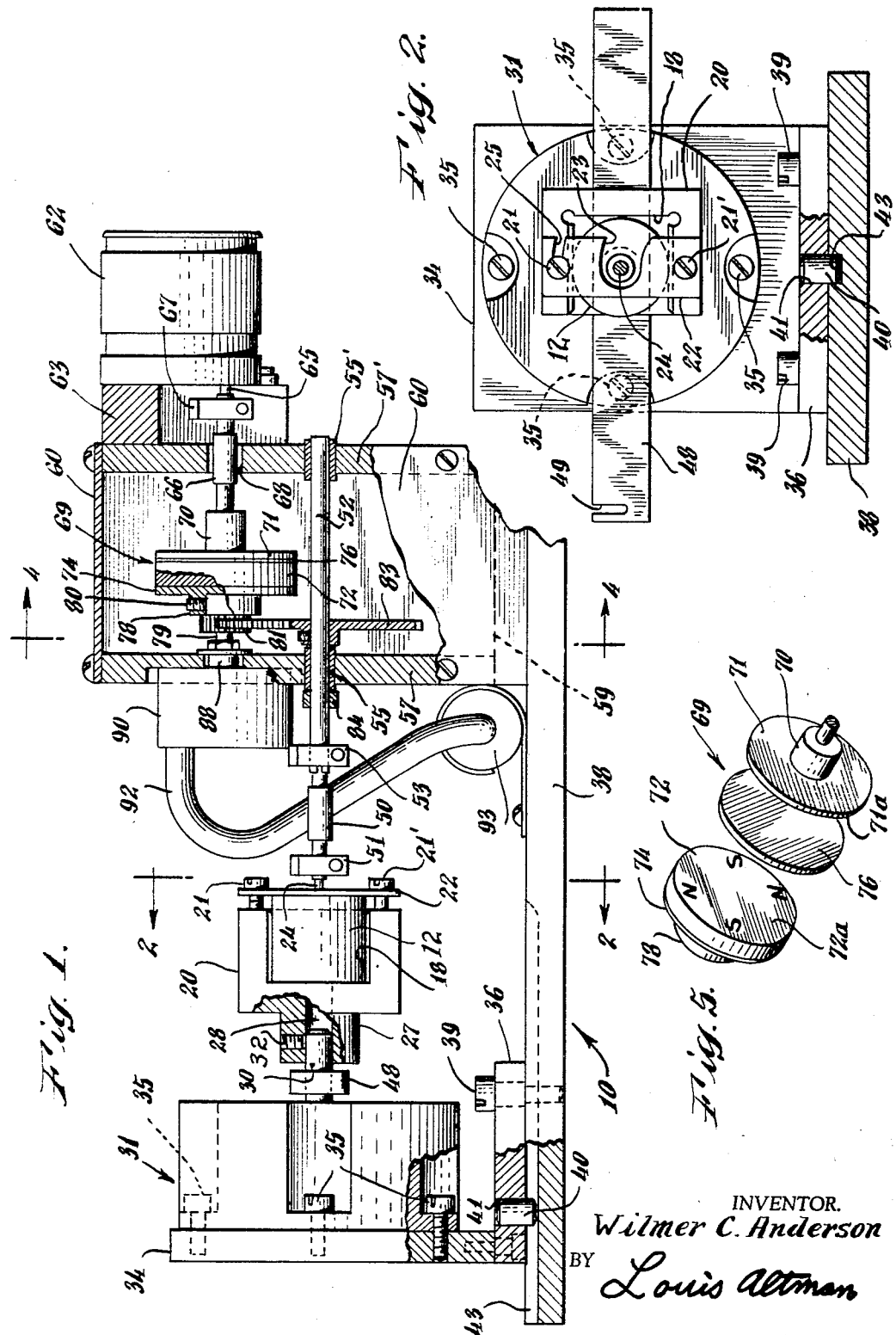

INVENTOR.
Wilmer C. Anderson
BY Louis Altman
ATTORNEY.

3,396,576
APPARATUS FOR MEASURING STATIC FORCES DYNAMICALLY
Wilmer C. Anderson, Greenwich, Conn., assignor to General Time Corporation, New York, N.Y., a corporation of Delaware
Filed Sept. 13, 1965, Ser. No. 486,946
6 Claims. (Cl. 73—89)

ABSTRACT OF THE DISCLOSURE

Apparatus for automatically measuring and plotting static torque output against position of the armature of rotary solenoids. The body of the solenoid is affixed to a strain gauge torque meter. The armature of the solenoid is connected through a gear train to the output shaft of a small electric motor. The small electric motor drives the armature at a rate much slower than it would normally rotate when energized. The motion of the armature is indicated by means of a potentiometer connected to the gear train. A magnetic slip clutch comprising magnets separated by a spacer from a magnetic permeable plate is incorporated into the gear train.

A fixture is also provided for plotting force versus armature position of linear solenoids.

---

This invention relates to an apparatus for measuring static forces dynamically. More particularly, the invention relates to a torque test fixture employing a novel method for measuring static forces produced by electromechanical actuators such as rotary and linear solenoids. By the method and apparatus of the invention, electrical signals suitable for plotting static force versus position of the movable actuator member or armature are developed in a continuous operation. The invention further provides an improved magnetic clutch used in the torque test fixture of the invention.

Rotary and linear solenoids are increasingly being employed in modern technical apparatus. They have particularly been applied to a large variety of actuation and control functions in aerospace equipment. These actuators are widely used to perform remote or automatic operations where pulsed direct current power must be converted to rotation, angular displacement or movement. Typical functions performed by such actuators include actuating valve vanes or shutters; advancing tape, film or paper for recording printing and the like; converting digital data to analog signals or displays; and a variety of other industrial control and safety functions. With the addition of ratchet assemblies, rotary actuators are useful in a variety of mechanical stepping, switching and indexing functions.

In many of these applications, the actuators employed must develop at least a predetermined minimum force output over the entire range of armature movement. In some instances, the relationship of force to position of the armature must be of a specified character. This is particularly true where the means actuated thereby must be operated at a prescribed rate, or as a specified function of time, or actuated from one condition limit to another in a specified time interval.

It therefore becomes necessary to readily calibrate such actuators to determine their individual characteristic relationship of force output to armature position over the entire range of movement of the armature. Thus, in rotary solenoids a plot of torque versus output shaft angle must be developed. Similarly, in a linear solenoid it is necessary to determine the relationship of force versus linear position of the solenoid plunger. Moreover, such calibration must often be done in test environments of varying temperatures, humidities, and pressures.

Heretofore, the most commonly used technique for calibrating electromechanical actuators has been to apply known forces to their armatures; for example by hanging weights to an arm attached to the output shaft of a rotary solenoid. The amount of force required to hold the armature at rest at various positions throughout its range of travel while the actuator is energized is recorded. Then, by plotting these forces as a function of armature position, a graph of static force versus armature position is obtained. It will be appreciated that a considerable number of points must be manually plotted if the curve is to accurately represent this relationship. Although this technique is reasonably accurate and reliable, it is exceedingly tedious and time consuming. For example, the arm attached to the output shaft of a rotary solenoid under test must be horizontal at each shaft position to be plotted.

Testing in this manner is particularly impractical in an environment test chamber. Either the chamber must be opened to adjust the apparatus for each position to be plotted or elaborate remote manipulators must be employed.

Furthermore, these prior art methods do not provide a continuous plot of force versus armature position and thus may not reveal nonlinearities occurring at unmeasured armature positions.

Accordingly, it is an object of the invention to provide a method for measuring the static force output of an electromechanical actuator. An additional object is to provided apparatus performing the above method.

A further object of the invention is to provide a method and apparatus of the above character for dynamically measuring such static forces.

An additional object of the invention is to provide a method and apparatus of the above character for measuring the static force over the entire range of travel of the armature of an electromechanical actuator. A further object of the invention is to derive such measurements in a continuous operation.

Another object of the invention is to provide a method and apparatus of the above character providing a continuous plot of force versus armature position.

A still further object of the invention is to provide a method of the above character which is carried out automatically and quickly. A related object of the invention is to provide apparatus of the above character, carrying out the above method, which is of simple, inexpensive design.

A further object of the invention is to provide a method of the above character and apparatus for carrying out such method, wherein the measurements may be automatically taken in rapid and continuous fashion while the electromechanical actuator is subjected to a wide range of environmental conditions.

Another object is to provide method and apparatus of the above character for determining frictional losses in an actuator.

An additional object of the invention is to provide an improved magnetic clutch ideally suited for use in apparatus of the above character.

Other objects of the invention will in part be obvious and will in part appear hereinafter.

The invention accordingly comprises the several steps and the relationship of one or more of such steps with respect to each of the others and the apparatus embodying features of construction, combinations of elements and arrangements of parts which are adapted to effect such steps, all as exemplified in the following detailed description. The scope of the invention will be indicated in the claims.

For a fuller understanding of the nature and objects of the invention, reference should be had to the following detailed description taken in connection with the accompanying drawings in which:

FIGURE 1 is a side view, partially broken away and partially in cross-section, of a preferred embodiment of a torque test fixture according to my invention;

FIGURE 2 is a sectional view taken along line 2—2 of FIGURE 1;

FIGURE 3 is a top view, partially broken away and partially in section, of the fixture of FIGURE 1;

FIGURE 4 is a sectional view taken along line 4—4 of FIGURE 1;

FIGURE 5 is an exploded view of a magnetic clutch assembly employed in the fixture of FIGURE 1;

FIGURE 6 is an electrical block diagram of the electrical circuitry connecting the fixture of FIGURE 1 to an X–Y plotter which continuously plots the torque versus shaft angle of a rotary solenoid;

FIGURE 7 is a graph showing a typical torque versus shaft angle curve of a rotary solenoid;

The same reference numerals refer to the same parts throughout the several views of the drawing.

Figure 8:
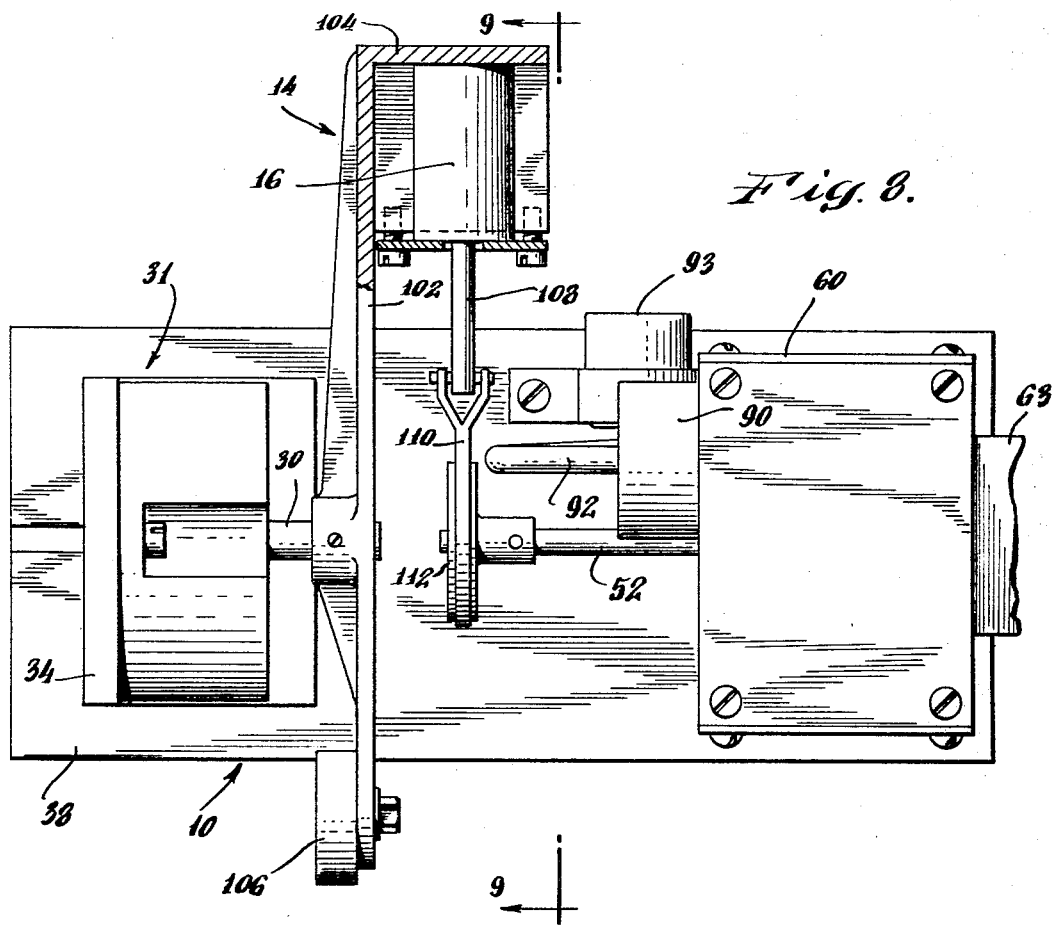
FIGURE 8 is a top view of the fixture similar to FIGURE 1 adapted for the testing of linear solenoids; and, FIGURE 9 is a sectional view taken along line 9—9 of FIGURE 8.

Broadly stated, the method of my invention is directed to measuring the static force developed in an electromechanical actuator. This is accomplished throughout the limits of movement of the actuating member of the armature thereof in a continuous and rapid fashion. The body of the actuator is clamped against movement. The actuator is electrically energized. The armature is driven by external drive means. The rate at which the armature is externally driven is significantly less than its rate of free movement occurring when the actuator is electrically energized. Consequently, the free movement of the armature is continuously resisted to the point of virtual static restraint. This develops a reactive force in the body of the actuator. This reactive force is sensed and a proportional electrical signal is developed. Simultaneously, the position of the armature is sensed and an electrical signal proportional thereto is likewise developed. A continuous plot of the magnitudes of these electrical signals is a plot of the static force developed by the actuator versus position of the armature thereof.

The apparatus for carrying out the above method comprises a force sensing device fixed to the body of the actuator. This force sensing device operates to provide an electrical signal proportional to the force developed in the actuator. A gear train is connected to the armature of the actuator. An electric motor, also connected to the gear train, drives the armature through its range of movement at a significantly slow rate relative to the rate of free armature movement. Thus, there is developed effectively static resistance to the movement of the armature. The resulting reactive force developed in the body of the actuator is sensed by the force sensing device. A position sensing device is mechanically coupled to the gear train. The position sensing device, e.g., a precision potentiometer, develops an electrical signal proportional to the instantaneous position of the armature. The electrical output signals from the force and position sensing devices are applied, after amplification, to an X–Y plotter to develop a curve of static force versus armature position.

An improved magnetic clutch is connected between the motor and the gear train. It operates to provide positive drive between the motor and the armature of the actuator throughout the permissible range of its movement. Once the limit of armature movement is reached, the magnetic clutch is designed to slip so as to prevent damage to the actuator.

The clutch comprises a first clutch disc connected to the gear train. A permanent magnet is bonded to the clutch disc. A clutch plate, of magnetic material, is driven by the motor. A spacer disc is removably interposed between the poles of the permanent magnet and the clutch plate. The magnetic force between the clutch plate and the permanent magnet causes frictional engagement of the face of the permanent magnet and the face of the clutch plate with the opposing faces of the spacer disc. Thus, the motor is drivingly connected to the gear train. The torque at which the magnetic clutch will begin slipping may be readily predetermined by selecting a spacer disc of appropriate thickness.

Now referring specifically to the drawings, the apparatus of my invention is embodied in a fixture, generally indicated at 10 and best seen in FIGURES 1 and 3. The fixture 10 of FIGURES 1 and 3 is specifically designed to measure the static output torque of a rotary solenoid 12. However, in FIGURES 8 and 9, there is disclosed an adaptor, generally indicated at 14, which may be used in adapting the fixture 10 to the measurement of the static output force developed by a linear solenoid 16.

In testing rotary solenoids, the solenoid 12, as seen in FIGURES 1 through 3, is placed in a recess 18 formed in a holder 20. A bar 22 spanning the open end of the holder 20 is clamped down on the body of the solenoid 12 by screws 21, 21' to fixedly hold the solenoid in the recess 18. As seen in FIGURE 2, the bar 22 is formed with a first slot 23, providing clearance for the output shaft 24 of the solenoid 12, and a second slot 25. Slot 25 allows the bar 22 to be swung out from engagement with screw 21 so as to facilitate the removal of the solenoid 12.

Opposite the open end of the holder 20, there is integrally formed a hub 27. The hub 27 is formed with an inner bore 28 into which is inserted the input shaft 30 of a torque sensor, generally indicated at 31. A set screw 32 threaded radially through the hub 27 rigidly connects the holder 20 to the input shaft 30 of the torque sensor 31.

The torque sensor 31 is of conventional construction such as may be obtained from Lebow Associates, Inc. of Oak Park, Mich. Using strain gauge elements, the torque sensor 31 provides an electrical output signal whose amplitude is proportional to the torque applied to the input shaft 30; the inner end of which is constrained from rotation.

As seen in FIGURES 1 through 3, the torque sensor 31 is mounted to an upright mounting plate 34 by a plurality of screws 35. The plate 34 is suitably mounted on a base plate 36. As best seen in FIGURES 1 and 2, the base plate 36 is removably secured to a base 38 of the fixture 10 by screws 39. A dowel 40 received in a hole 41 formed in the base plate 36 extends into a longitudinal slot 43 formed in the base 38 so as to permit the mounted torque sensor 31 to be slid longitudinally into place, and once in place, prevents the torque sensor 31 from swinging laterally.

An elongated bar 48 is mounted at its mid-point on the input shaft 30 in between the hub 27 and the body of the torque sensor 31 (FIGURES 1, 2 and 3). As best seen in FIGURE 2, a slot 49, opening upwardly, facilitates the hanging of known weights on the bar so as to impart a predetermined torque to the input shaft 30 of the torque sensor 31. By this means, the torque sensor 31 may be readily calibrated.

Referring to FIGURES 1 and 3, the output shaft 24 of the solenoid 12 is drivingly connected to one end of a universal joint coupling 50 by means of a clamp 51. The other end of the coupling 50 is drivingly connected to a shaft 52 by means of a clamp 53. Shaft 52 is journalled in bushings 55, 55' mounted in spaced end plates 57, 57'. The plates 57, 57' are affixed to a base plate 59, which is in turn secured to the base 38 of the fixture 10. The space between the end plates 57, 57' is enclosed by top and side covering members 60.

Still referring to FIGURES 1 and 3, an electric motor 62 is secured to end plate 57' by a mounting block 63. The motor 62 is preferably a slow speed motor such as manufactured by the Haydon Division of General Time Corporation in Torrington, Conn. The output shaft 65 of motor 62 is drivingly connected to a universal joint 66 by a clamp 67. The coupling 66 extends through a clearance hole 68 in end plate 57' to where its other end is drivingly connected to a magnetic clutch assembly generally indicated at 69.

The construction of the clutch assembly 69 is best seen in FIGURE 5. The one end of the coupling 66 is drivingly connected to the hub 70 of a clutch plate 71 formed of a suitable magnetic metal such as steel. A permanent magnet 72 having a suitable number and arrangement of magnetic poles such as the four shown in FIGURE 5, is cemented to the face of a disc 74. Interposed between the face 72a of the permanent magnet 72 and the face 71a of the clutch plate 71 is a spacer disc 76 made of suitable nonmagnetic slippery material such as a polymerized fluorocarbon, for example Teflon. When the various parts of the magnetic clutch assembly 69 are juxtaposed in axial alignment as seen in FIGURES 1 and 3, the magnetic force of the permanent magnet 72 attracts the clutch plate 71 such that their respective faces forcibly frictionally engage the opposing faces of the spacer disc 76. Thus, the drive of the motor 62 is communicated from the clutch plate 71 to the disc 74.

It will be appreciated that the holding torque of the clutch asembly 69 up to which positive drive is maintained depends upon the magnetic attractive force exerted on the clutch plate 71 and the coefficients of friction between the faces of the spacer disc engaging the face of the permanent magnet 72 and the face of the clutch plate 71. In addition to its simplicity, an important feature of the clutch assembly 69 is that the value of holding torque can be readily varied by the interchange of spacer disc 76 having different thicknesses. It is understood that the greater the thickness of the spacer disc 76, the lesser the attractive magnetic force between the permanent magnet 72 and the clutch plate 71, and the lesser the rated value of holding torque; and vice versa.

Returning to FIGURES 1 and 3, the clutch disc 74 to which the drive of the motor 62 is communicated is formed with a hub 78. The hub 78 has an inner bore into which is received one end of a stub shaft 79. A set screw 80 threaded radially through the hub 78 fixedly connects the stub shaft 79 to the clutch disc 74. A spur gear 81 fixed to the stub shaft 79 drivingly engages a larger gear 83 fixed to the shaft 52 as seen in FIGURES 1, 3 and 4. A collar 84 fixed to the shaft 52 beyond end plate 57 cooperates with the gear 83 to prevent endwise movement of the shaft in bushings 55, 55'. The relationship of the sizes of gears 81 and 83 are such as to achieve a further reduction in the already slow output shaft speed of motor 62.

The other end of the stub shaft 79 is drivingly connected by a suitable coupling 88 to the input shaft of a precision potentiometer, generally indicated at 90. A suitable precision potentiometer for use in the apparatus of my invention may be obtained from Spectrol Potentiometer Co. In order to protect the potentiometer 90 during operation of the fixture 10 in low temperature environments, the inside of the potentiometer is exposed through a tubing 92 to a suitable desiccant within a container 93. The desiccant absorbs any condensation as may develop in the potentiometer during operation in low temperature environments.

The operation of the disclosed apparatus in FIGURES 1 through 4 by which the method of my invention is practiced is as follows. Assuming the torque sensor 31 has been duly calibrated in the manner described above, the rotary solenoid 12 is securely clamped in place in the recess 18 formed in the holder 20. The output shaft 24 of the solenoid is then connected by clamp 51 to the end of the coupling 50. Both the motor 62 and the solenoid 12 are electrically energized. The rotation of the output shaft 65 to the motor 62 is communicated by the drive train consisting of clutch assembly 69, gear 81, gear 83 and shaft 52 to the output shaft 24 of the rotary solenoid 12. The direction of rotation of the solenoid output shaft 24 by the motor 62 is in the same direction as it would rotate upon electrical energization of the solenoid but at a significantly slower angular rate. A suitable slow angular rate of solenoid output shaft rotation may be on order of two degrees per second. Consequently, the normal rotation of the output shaft 24 due to electrical energization of the solenoid 12 is effectively statically constrained by the motor 62 and the connecting drive train. In that the solenoid output shaft 24 is constrained from its normal movement, a reactive torque is developed in the body of the solenoid. This reactive torque is communicated through the holder 20 to the input shaft 30 of the torque sensor 31. The torque sensor 31 develops an electrical output signal whose amplitude is proportional to this reactive torque which, for all practical purposes, is equal to the static torque developed by the solenoid output shaft 24.

At the same time, the input shaft of the precision potentiometer 90 is being rotated by the motor 62 so as to derive an electrical signal output whose amplitude is continuously proportional to the angular position of the solenoid output shaft 24.

As seen in the schematic block diagram of FIGURE 6, the electrical signals developed by the torque sensor 31 and the precision potentiometer 90 are amplified by amplifiers 97 prior to application as separate inputs to a conventional plotter 96. Since the output signals of the sensor 31 and the potentiometer 90 are continuous in nature, the plotter 96 can develop a continuous curve of static torque versus shaft angle of solenoid 12. A typical torque curve for a rotary solenoid is shown in FIGURE 7. This continuous operation, when contrasted with the point by point plotting required by prior techniques, quite obviously produces a more accurate torque curve in considerably less time.

It is typically the case with rotary solenoids that the output shaft 24 has an effective angular rotation upon solenoid energization of substantially less than 360°. Typically, physical stops are provided to limit the solenoid shaft rotation to a precise angle such as 20°. Thus, prior to energization of the solenoid 12 and motor 62 in practicing my method, the solenoid output shaft 24 is rotated until it engages one of the physical stops. The solenoid output shaft is then rotated until it hits the other physical stop. At the shaft rotational rate of two degrees per second, the torque curve of FIGURE 7 can be developed in approximately 20 seconds. When the second stop is encountered, it is necessary that the clutch assembly 69 begin slipping in order that the solenoid 12 not be damaged. As disclosed above, this can be readily achieved by selection of a spacer disc 76 having an appropriate width such that the clutch will readily begin slipping when the solenoid output shaft 24 reaches its limits of rotation.

The motor 62 is preferably a reversible slow speed motor having separately energizable windings for forward and reverse drive. When the solenoid output shaft 24 has been rotated in the forward direction from one physical stop to the other in developing a torque curve, the solenoid 12 is deenergized and the motor 62 reversed to return the solenoid output shaft 24 to its other physical stop in preparation for another test run, possibly under different environmental conditions. For low temperature test runs it is found convenient to preliminarily energize both the forward and reverse motor windings simultaneously in order to warm up the motor. This insures smooth motor operation throughout a test run.

Since the solenoid output shaft 24 is driven by the motor 62 at such a slow rate as to be effectively statically constrained, it will be seen that a static torque curve can be developed by driving the solenoid output shaft in a direction opposite to its normal direction of rotation upon solenoid energization in the normal sense. It is found that for a given solenoid, this torque curve lies somewhat above the normal torque curve developed when the solenoid output shaft 24 is driven in the direction of its free movement.

Since it is found that the torque curves developed by my invention are, for all practical purposes, identical to torque curves developed by the purely static technique used heretofore, it appears that the differences in the torque curves are due to friction in the solenoid 12. This can be seen from the fact that when the solenoid output shaft 24 is driven in its direction of free movement, the friction in the solenoid 12 subtracts from the reactive torque sensed by the torque sensor 31. Whereas, when the solenoid output shaft 24 is driven in the opposite direction, the frictional forces in the solenoid 12 add to the reactive torque developed in the body of the solenoid. Since a pure torque curve would lie midway between these two torque curves, this method can be used to determine the friction in the solenoid; the friction being equal to one half the difference between the two curves. Although the dynamic aspects of my invention do not introduce significant errors into the static torque curve, this two directional test run is seen to provide a method for accounting for such errors, assuming that the friction in the solenoid can be determined independently.

Figure 9:
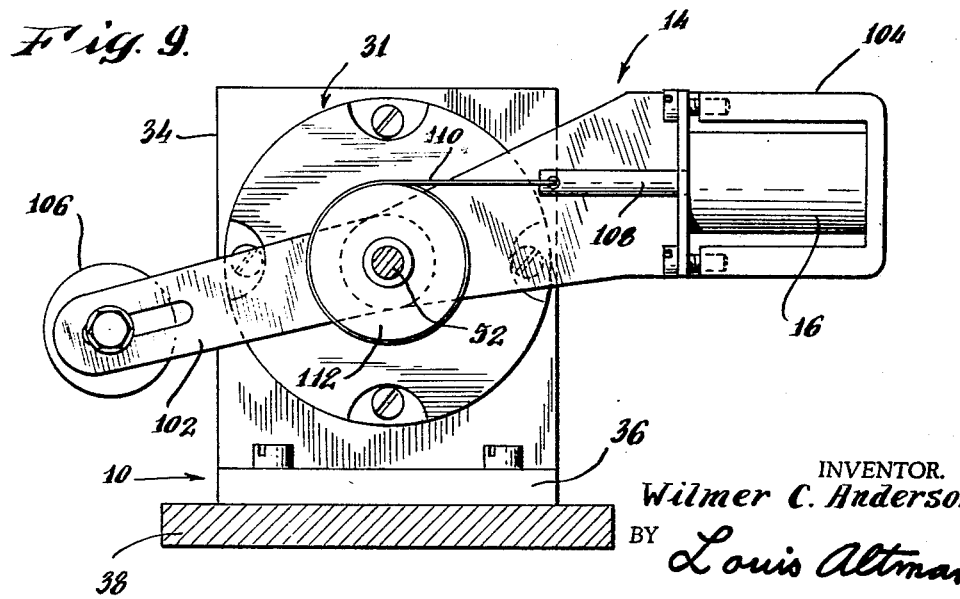

The fixture 10 of FIGURES 1 through 4 may be adapted to the measurement of forces developed by a linear solenoid 16 by substituting the adapter 14 of FIGURES 8 and 9 for the holder 20. The adapter 14 includes an arm 102 which is keyed to the input shaft 30 of the torque sensor 31. On one end of the arm 102 is mounted a holder 104 for rigidly securing the body of the solenoid 16 in place on the adapter arm. The holder 104 may be constructed in the manner of holder 20 of FIGURE 1. The other end of the adapter arm 102 adjustably mounts a counterweight 106 for balancing out the weight of the holder 104 and solenoid 16 at the other end of the adapter arm. Thus, prior to energization of the linear solenoid 16, no torque is applied to the input shaft 30 of the torque sensor 31.

A plunger 108 of the solenoid 16 is affixed to one end of a tape 110. The other end of tape 110 is affixed to the periphery of a wheel 112 keyed to shaft 52 of the torque test fixture 10.

In operation, the motor 62 (FIGURE 1), when energized, drives the wheel 112 in a clockwise direction as seen in FIGURE 9. This is the same direction that the wheel 112 would be turned upon energization of the solenoid 16. This is seen by the fact that the plunger 108 of solenoid 16 moves to the right as seen in FIGURE 9 upon solenoid energization. The solenoid plunger 108, being connected to the wheel 112 by the cord 110, produces a clockwise torque on the wheel 114.

Since the wheel 114 is rotated clockwise by the motor 62 at a significantly slower rate than it would be clockwise rotated by actuation of the linear solenoid 16, the movement of the solenoid plunger 108 is effectively statically resisted by the drive train and motor 62. As a result, the reactive force developed in the body of the linear solenoid 16 produces a counterclockwise torque as seen in FIGURE 9 which is imparted to the input shaft 30 of the torque sensor 31. It will thus be seen that by use of the adapter 14, the fixture 10 may be readily adapted to the measurement of the static forces developed by a linear solenoid.

It will thus be seen that I have provided a novel method, as well as apparatus for the performance thereof, for dynamically measuring the static forces developed by an actuator. The apparatus embodied in the torque test fixture operates automatically and without human intervention to determine the static force developed by the movable actuating member of an actuator throughout its limits of movement. Thus, the torque test fixture may operate to carry out the method in a test environment of extreme temperatures and pressures. The test run may be carried out rapidly and accurately.

In the disclosed embodiments, the reaction force developed in the body (stator) of the actuator is measured. While this is the more straight-forward manner in which to determine the static force developed by the actuating member, it will be readily observed that the actuating member could be connected to the input shaft of the torque sensor and the body of the actuator slowly rotated by operation of the motor 62. Either technique is considered to be the full equivalent of the other and within terms of the foregoing description and the appended claims.

It will thus be seen that the objects set forth above, among those made apparent from the preceding description, are efficiently attained and, since certain changes may be made in carrying out the above methods and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. A test fixture for determining the static force developed by the movable armature of an energized actuator producing an increasing force in the direction of its energized increasing movement over at least a portion of its stroke throughout its limits of movement, said apparatus comprising, in combination:
    (A) a holder for removably clamping the body of the actuator in place;
    (B) a strain gauge device having
        (a) an input shaft fixedly connected to said holder, and
        (b) operating to provide an electrical output proportional to the torque imparted to said input shaft;
    (C) a drive train connected at one end to the armature of the actuator;
    (D) a motor operatively connected to the other end of said drive train and
        (a) operating to drive the armature in the same direction it would move upon energization of the actuator but at a significantly slower rate
            (1) whereby to effectively statically constrain the armature so as to develop a reaction torque in the body of said actuator for application to said strain gauge device; and,
    (E) a friction clutch in said drive train, whereby when the actuator reaches its limit of travel, the clutch will slip.

2. The device defined in claim 1 wherein said drive train comprises:
    (a) a magnetic clutch having
        (1) a clutch plate connected to the output shaft of said motor,
        (2) a disc connected to the armature of the actuator,
        (3) a permanent magnet fixedly connected to said disc, and
        (4) a spacer disc interposed between said permanent magnet and said clutch plate and having a thickness so as to permit sufficient magnetic attractive force between said permanent magnet and said clutch plate to maintain positive drive between said motor and the armature throughout its limits of movement.

3. The apparatus defined in claim 2, wherein said drive train further comprises:
    (B) a speed reduction gear train.

4. A test fixture for deriving a plot of static output torque versus output shaft position of an energized electromagnetic rotary actuator producing an increasing force in the direction of its energized increasing movement over at least a portion of its stroke, said fixture comprising, in combination:
(A) a holder for removably clamping the body of the actuator in position;
(B) a strain gage device having an input shaft connected to said holder and
 (a) operating to provide an electrical signal proportional to the torque imparted to said input shaft;
(C) a drive train connected at one end to the output shaft of the actuator;
(D) a motor
 (a) connected to the other end of said drive train, and
 (b) operating to drive the output shaft in the same direction it would rotate upon electrical energization of the actuator, but at a significantly slower rate,
  (1) whereby to effectively statically constrain the output shaft so as to develop a reaction torque in the body of the actuator substantially equal and opposite to the static output torque for application to the input shaft of said strain gauge device;
(E) a potentiometer
 (a) having an input shaft connected to said drive train, and
 (b) operating to develop an electrical signal proportional to the angular position of said output shaft; and
(F) an X–Y plotter connected to receive the electrical signals from said strain gauge device and said potentiometer, and
 (a) operating to develop a continuous plot of static output torque versus output shaft angle of the actuator; and,
(G) a friction clutch in said drive train, whereby when the actuator reaches its limit of travel, the clutch will slip.

5. The apparatus defined in claim 4 wherein
(c) said motor is a reversible drive motor operable to drive the output shaft in either direction during energization of the actuator,
 (1) whereby to derive a separate torque versus shaft angle plot for each direction of output shaft rotation,
 (2) the torque difference between said plots being indicative of frictional losses in the actuator.

6. The apparatus defined in claim 5 wherein
(3) said motor is adapted for energization in a manner tending to drive in both directions simultaneously whereby to generate heat for preconditioning said motor for operation in low temperature environments.

References Cited

UNITED STATES PATENTS

| | | | |
|---|---|---|---|
| 2,715,334 | 8/1955 | Mouttet | 73—16 |
| 3,282,083 | 11/1966 | Sonderegger | 73—94 |
| 2,350,072 | 5/1944 | Simmons | 73—88.5 X |
| 3,285,065 | 11/1966 | Rager et al. | 73—161 |

OTHER REFERENCES

Bulova Research & Development Laboratories Publication Describing Torquemeter, PB No. Ed. 11–55–106.
Sadamel, S.A.: Microtecnic, vol. V, No. 5.

RICHARD C. QUEISSER, *Primary Examiner.*

JAMES H. WILLIAMSON, *Assistant Examiner.*